June 4, 1963
C. GRUERE
3,092,190
LARGE DIAMETER EARTH DRILL
Filed April 4, 1960
2 Sheets-Sheet 2
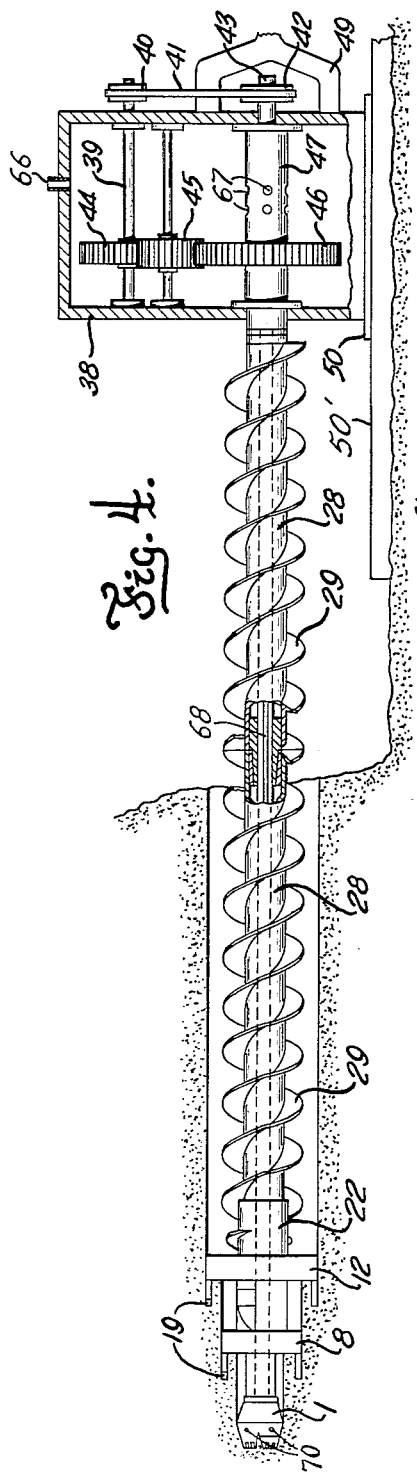
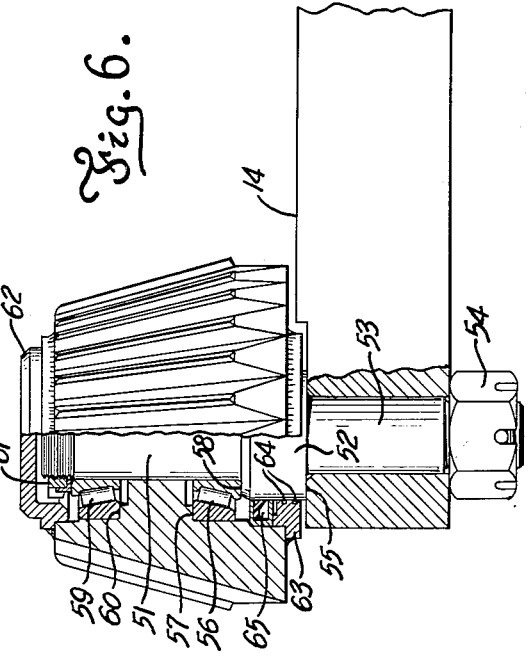
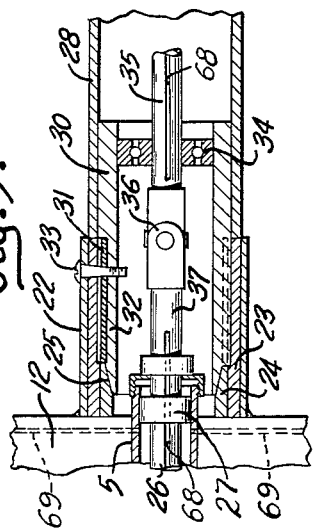
INVENTOR.
Charles Gruere
BY
Andrus & Starke
Attorneys

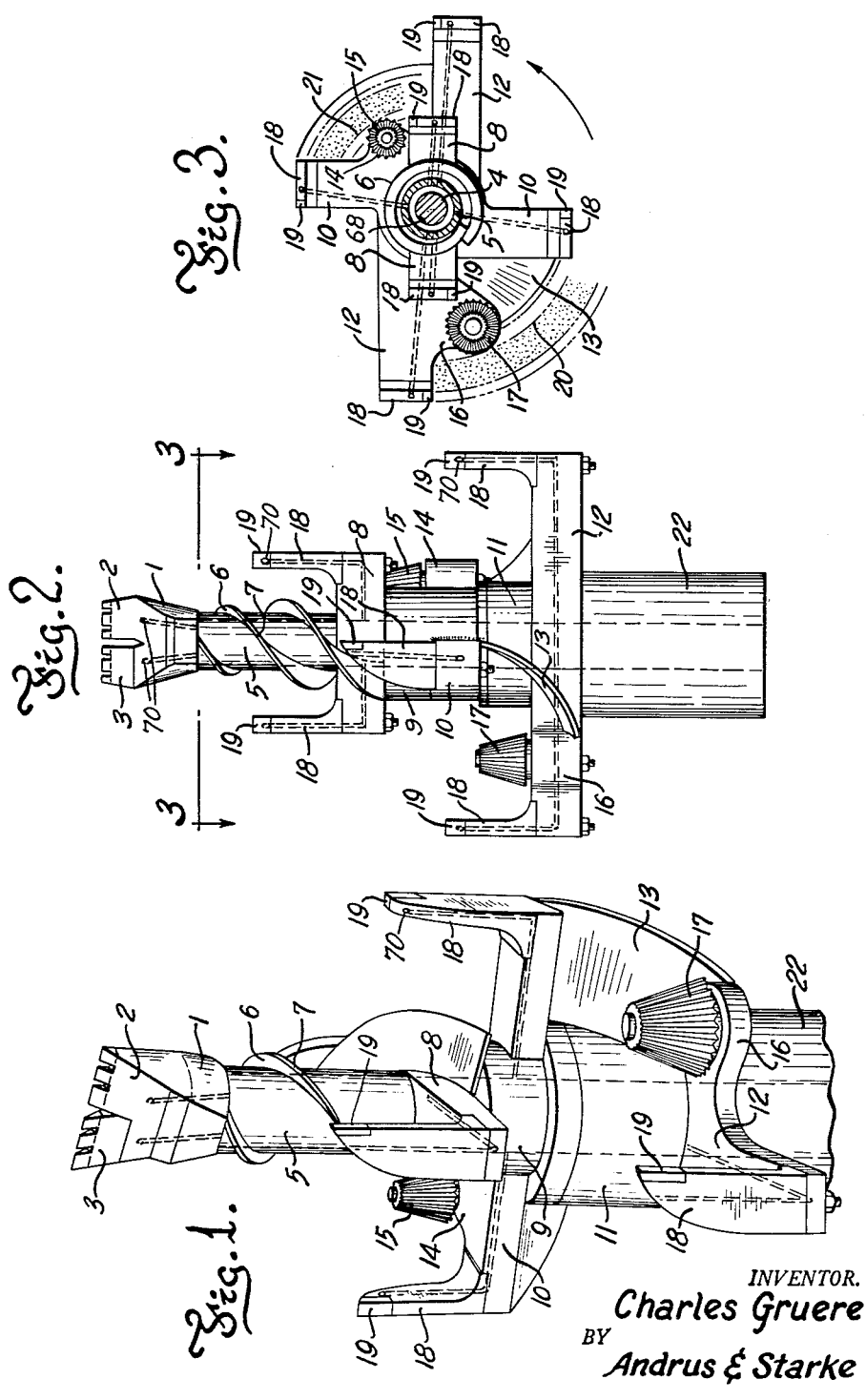

United States Patent Office 3,092,190
Patented June 4, 1963

3,092,190
LARGE DIAMETER EARTH DRILL
Charles Gruere, 21 Rue de Teheran, Paris, France
Filed Apr. 4, 1960, Ser. No. 19,730
6 Claims. (Cl. 175—173)

This invention relates to a large diameter earth drill of the type employed in mines and in tunneling.

Some of the problems which arise with large diameter drills include: (1) the large power consumption; (2) the wear on the cutter teeth and tendency to reduce the spoil to a powder state; (3) the difficulty of cutting circular ridges of spoil between the concentric areas of initial cut; and (4) the difficulty of removing the spoil.

The present invention provides a drill which requires less power, is less wearing on the cutting tools, breaks the spoil into lumps instead of grinding it to powder, and more readily removes the spoil.

In carrying out the invention the central lead cutter is rotated at a much faster rate than the outer concentric cutting head and thereby cuts with less power consumption than would be the case if the central cutter were mounted on the drill head to rotate with it. The cutter head is comprised of a plurality of diametric arms of successively greater radial extent and each arm carries a cutter extending forwardly a substantial distance ahead of the arm on its outer extremity. The cutter head is mounted on a tubular support of substantial length and having a spiral flight on its outer surface to aid in the removal of spoil during drilling.

One of the important features of the invention lies in the use of conical rotary cutters mounted on the cutter arms and disposed to engage the circular ridges of uncut material between the circular paths of the successive cutters to break the material into lumps. It has been found that this means of breaking the material produces much less powder than cutter blades would do. It is therefore preferable to cut by blades only a minimum amount of material and to utilize the roller breakers for as much of the material as possible. The roller breakers also appear to take substantially less power than cutter blades do.

The outer support tube for the cutter head may be made in sections which may be added as the drilling progresses by suitably coupling the sections in place. Likewise, the central shaft which drives the central lead cutter is made in sections with suitable end couplings and with suitable bearings for rotation in the corresponding outer tube sections.

The cutter head preferably has individual spiral flights of progressively greater diameter from a minimum adjacent the lead cutter to a maximum corresponding to the last cutter arm so that the spoil is readily removed from the cutting region. If desired spoil removal may be facilitated by fluid flow by suitable pump means toward the drilling region through the outer tube sections and discharging at the cutter blades where the fluid tends to return rearwardly from the drilling region carrying dust and spoil with it.

The accompanying drawings illustrate the best mode presently contemplated for carrying out the invention.

In the drawings:

FIGURE 1 is a perspective view of the drill head;

FIG. 2 is a side elevation of the head;

FIG. 3 is a transverse section taken on line 3—3 of FIG. 2;

FIG. 4 is a diagrammatic view showing a drilling operation, and the drive for the drill;

FIG. 5 is a detail section of a coupling between the head and the first section; and FIG. 6 is a detail axial section of the mounting for a conical roller.

Referring to the drawings, the drill head comprises a central lead cutter 1 having suitable teeth 2 and 3 disposed to face forwardly in the direction of rotation of the cutter. The teeth 2 and 3 preferably have hard metal inserts, such as tungsten carbide cutting edges therefor.

The central lead cutter 1 has an axial shank 4 extending through a tubular outer housing 5 with suitable thrust and radial bearings to support the cutter for rotation. Spiral flights 6 are secured to the outer surface of housing 5 to aid movement of spoil rearward upon rotation of the housing. The outer edge 7 of flights 6 progressively extends farther from the axis of the housing rearwardly from cutter 1.

The tubular housing 5 constitutes the central core of the cutting head and carries a first pair of arms 8 extending radially therefrom a short distance and carrying forwardly extending cutter support arms 18 at their extremities.

The inner ends of arms 8 are made integral as by welding with a cylindrical member 9 which in turn carries a second pair of arms 10 extending at approximately 90° from the direction of arms 8 and in a transverse plane rearwardly therefrom. Arms 10 extend radially a substantially greater distance than arms 8 and carry at their outer extremities corresponding forwardly extending cutter support arms 18 similar to the arms 18 on the arms 8.

The arms 10 are made integral as by welding at their inner ends with a second cylindrical member 11 of larger diameter than member 9 and which extends rearwardly from arms 10. The member 11 carries a third pair of arms 12 generally parallel to arms 8 and which carry corresponding forwardly extending cutter support arms 18 at their outer extremities at a substantially greater distance outwardly from the axis of the head than support arms 18 on arms 10.

The arms 12 are at right angles to the arms 10 diametrically of the cutter head and are joined thereto by helical blades 13 which continue movement of spoil rearwardly from flights 6.

One of the arms 10 has a lateral extension 14 rearwardly thereof considering the direction of rotation and which carries a coned spoil breaking wheel 15 as shown in detail in FIG. 6 and described hereinafter. Similarly, one of the arms 12 has a lateral extension 16 constituting a part of flight blade 13 and on which is mounted a coned spoil breaking wheel 17.

The breaker wheels 15 and 17 have their outer spoil contacting surfaces grooved to engage a ridge of uncut material and stress it to a point of breaking up into lumps, the wheels rotating freely as the cutter head rotates.

The several cutter support arms 18 on radial arms 8, 10 and 12 are narrow in radial extent and carry a cutter 19 having a carbaloy cutting edge facing forwardly in the direction of rotation, to thereby cut a plurality of thin concentric grooves in the rock or other material being drilled, leaving substantial ridges therebetween. The breaker wheels 15 and 17 are disposed to engage the side of the corresponding ridge and to crumble the latter into lumps as distinguished from grinding it to powder.

For this purpose the wheel 15 has a thick metal rim or shell which is conical or tapered in a forward direction with its axis generally parallel to the axis of the cutter head and disposed to ride in the groove or path provided by the cutter 19 carried by arms 8. Likewise, wheel 17 has a thick metal rim or shell which is conical or tapered in a forward direction with its axis generally parallel to the axis of the cutter head and disposed to ride in the groove or path provided by the cutters 19 carried by arms 10.

The tips of wheels 15 and 17 preferably do not extend as far forward from the corresponding supporting arms 10 and 12 as the corresponding cutter support arms 18 and cutter edges 19. In this way wheel 15 will engage the ridge 21 of material at the side thereof cut by the cutters 19 on arms 8 after the cutters 19 on arms 10 have cut a groove forming the outer side of the ridge 21 so that the ridge can be readily crumbled as it rides up the taper on the wheel. Likewise wheel 17 will engage the ridge 20 of material at the side thereof cut by the cutters 19 on arms 10 after the cutters 19 on arms 12 have cut a groove forming the outer side of the ridge 20 so that the ridge can be readily crumbled as it rides up the taper on the wheel.

The action of the breaker wheels 15 and 17 is to push radially outward on the ridges and thereby displace the rock in broken lumps which are moved rearwardly by flights 13. Since the wheels 15 and 17 are conical they increase the lateral pressure on the corresponding ridges 21 and 20 as the drill advances thereby breaking down the entire ridge before it reaches the next set of arms.

The ridge that is formed between the central lead cutter 1 and the first set of cutters 19 on arms 8 is broken by the tapered flight 6 as represented by edge 7 which causes an outward expansion of the ridge and its breaking up before it is engaged by arms 8. In this way, and also by employing cutters 19 as narrow as possible, a minimum of pulverulent material is produced and a major part of the spoil is in lumps.

The cutting head comprising the several parts 5 to 21, inclusive, has a cylindrical shank 22 extending rearwardly from arms 12, and which has a socket 23 secured therein for receiving the end of a section of drive tube.

The socket 23 is internally fluted and has a tapered wedge member 24 with the taper 25 facing inwardly and rearwardly to provide a female recess for a connection with the drive tube.

The tubular housing 5 extends centrally through members 9 and 11 and into shank 22 as shown in FIG. 5. The shank 4 of cutter 1 is secured to the end of a shaft 26 supported axially of housing 5 by suitable thrust and radial bearing 27.

The drive tube 28 for the cutter head has a spiral flight 29 on its outside and is provide with a male connecting member 30 projecting therefrom into the socket provided by the taper 25 of wedge member 24. The outer surface of the projecting end of member 30 has longitudinal grooves 31 to receive the complimental flutes 32 of socket member 23 and thereby provide a circumferential interlock for driving the cutter head when drive tube 28 is rotated.

The coupling between drive tube 28 and the cutter head is secured by a plurality of circumferentially spaced tapered screws 33 which extend radially through shank 22 and socket 23 and are threaded into coupling member 30.

The drive tube 28 is constructed in sections adapted to be coupled end to end to provide for adding of more sections as the drilling progresses. Each section of tube 28 has internal bearings 34 near the ends thereof for supporting a corresponding section of a shaft 35, the forward end of which is coupled by a suitable universal joint 36 to the end 37 of shaft 26.

The coupling between sections of the drive tube 28 may be similar to that just described between shank 22 and the first section of tube 28, and the coupling between sections of drive shaft 35 should be a universal joint 36, as just described between shaft end 37 and the first section of shaft 35.

In this way the sections of tube 28 and shaft 35 may be suitably short for convenience in transportation and the drive for the drill may be retained at all times near to the position where the drilling commences.

The drive may comprise a housing or casing 38 which may be substantially fluid tight to receive air or other fluid under pressure to be forced into drive tube 28 and from there into the cutter head where it is discharged through suitable holes near the cutters. For this purpose a pipe inlet 66 may supply air or fluid to housing 38, and holes 67 in tube 28 serve to conduct the air into the tube. The air or fluid is then conducted by any suitable means into the several elements of the drill head, as by the grooves 68 in shafts 26, 35 and 37, the holes 69 in the arms 12 and other arms, as shown in FIG. 5, and is discharged behind the several cutters through holes 70. The air or other fluid serves to cool the tools or cuters 1 and 19 and also to aid in the removal of dust and spoil.

The main drive shaft 39 is driven by a suitable motor or engine, not shown, and extends across the housing 38 in suitable bearings and through one wall of the housing. A sprocket 40 is secured on the outer end of shaft 39 and receives a chain 41 which in turn drives a sprocket 42 on a shaft 43 aligned with and coupled to the rear end of shaft 35 for driving tool 1.

The housing 38 contains reduction gearing for driving tube 28. For this purpose the main drive pinion 44 on shaft 39 in housing 28 meshes with a gear 45 on a countershaft. In turn gear 45 meshes with a driven gear 46 on the hollow tubular shaft 47. The shaft 47 extends through the wall of casing 38 and is aligned with and coupled to the rear end of drive tube 28. The shaft 47 has suitable openings inside the casing 38 for receiving fluid and passing it into drive tube 28.

The back wall of housing 38 may have means 49 for applying a jack support thereto to feed the same to advance the drill. For this purpose the housing 38 may be supported on runners 50 riding on suitable tracks 50' on the ground.

A suitable detail construction for the mounting for breaker wheels 15 and 17 is shown in FIG. 6. In this construction each mounting comprises a pivot pin 51 having a central enlargement 52.

One end of pin 51 constitutes a bolt 53 extending through and fitting in an opening in the lateral arm extension 14 or 16. A nut 54 is threaded upon the protruding end of bolt 53 and tightened against the arm to secure the pivot pin in place by clamping of the arm between the nut 54 and a flat shoulder 55 on the central enlargement 52.

The other end of pin 51 carries a roller bearing 56 having its rollers taper mounted in the cages to provide for axial thrust as well as rotational support. The wheel 15 or 17, as the case may be, is mounted on the bearing 56 with an internal shoulder 57 of the wheel thrust against the outer cage of the bearing while the shoulder 58 on enlargement 52 supports the inner cage against the thrust.

A second roller bearing 59 is disposed at the upper end of the pin 51 and has its rollers taper mounted opposite to the rollers for bearing 56, whereby the tightness of the bearing may be determined. The outer cage of bearing 59 rests on an internal shoulder 60 in the wheel and a lock nut 61 threaded on the end of the pin 51 thrusts against the inner cage of the bearing to hold the wheel assembly in place on pin 51.

A cap 62 fits over the end of pin 51 and is welded around its circumference to the end of the wheel to prevent dirt from getting into the bearings. The opposite end of the wheel carries a journal bearing ring 63 which bears against the outer cylindrical surface of the enlargement 52 and has suitable circumferential grooves receiving sealing material 64 and a chevron packing 65 to prevent dirt from getting into the bearings from the larger end of the wheel.

The sealed chamber within the wheel and containing the bearings 56 and 59 can be filled with lubricant prior to applying the cap 62 thereto.

The outer surface of each wheel is grooved longitudinally and the teeth between the grooves are preferably faced with tungsten carbide or similar hard material. The wheel is thus rotated as it rides along the side of the corresponding ridge of material, as previously described.

The invention provides a drill for rock wherein a minimum of dust is produced and the breaking up of the material into lumps is obtained without the use of high power input. The drill may have any suitable number of additional cutter arms depending upon the diameter of the hole to be drilled. If more than the three sets of arms are employed it may be desirable to provide an additional head with an additional concentric drive tube rotating at a different speed or in the opposite direction. Only the outermost drive tube should have the spiral flight 29.

Various modes of carrying out the invention are contemplated within the scope of the following claims particularly pointing out and distinctly claiming the subject matter which is regarded as the invention.

I claim:

1. A rotary large diameter rock drill comprising a rotary shaft of universally connected sections of predetermined unit lengths, a central lead drill carried by the forward end of said shaft, a tubular outer shaft substantially concentric of said first named shaft and of rigidly connected sections of corresponding unit lengths to provide for insertion and removal of shaft sections as needed, bearing supports for said first named shaft sections within the corresponding tubular shaft sections, a drill carried by the forward end of said tubular shaft of substantially greater diameter than said lead drill and tubular shaft, a spiral flight carried on the outside of said tubular shaft, and means to rotate said shafts separately to provide different speeds of rotation for said drills.

2. The construction of claim 1 in which said last-named drill comprises a plurality of successive pairs of diametrically opposed radial arms spaced axially of the shafts and with each successive pair of arms rearwardly from the lead drill of substantially greater radial length than the next preceding pair of arms, a radially narrow cutter support arm extending forwardly in the direction of drilling from the outer end of each of said radial arms with a cutter at the forward tip of the support arm, and a rock splitting wheel carried by at least one arm of each succeeding pair of radial arms at a position offset from the cutter thereon and radially positioned to engage the inner wall of the cut passing the next preceding cutters to split the rock thereof outwardly after cutting of a circumferential groove therein by the cutter carried by the arm upon which the wheel is supported.

3. The construction of claim 2 and spirally disposed sections of flights adjacent said pairs of arms to remove split rock rearwardly past the drill.

4. In a drill of the class described, a large diameter rotary shaft having a spiral flight thereon for the removal of spoil rearwardly from drilling operations, a drill on the forward end of said shaft secured thereto for rotation therewith and comprising a plurality of successive pairs of diametrically opposed radial arms spaced axially of the shaft, the arms of each successive pair being disposed at approximately 90° from those of the next preceding pair and extending radially outward for a substantial distance greater than those of the next preceding pair, a radially narrow cutter carried at the end of each radial arm by a support arm extending forwardly a substantial distance from the radial arm to cut a circular groove in the face of the rock, a rock splitting wheel carried by at least one arm of each succeeding pair of radial arms at a position offset from the cutter thereon and radially positioned to engage the inner wall of the cut passing the next preceding cutters to split the rock thereof outwardly after cutting of a circumferential groove therein by the cutter carried by the radial arm upon which the wheel is supported, and drill means disposed axially of said shaft and leading said cutters.

5. The construction of claim 4 in which each rock splitting wheel is mounted on a pivot pin removably carried by a part of the corresponding radial arm of the drill and extending forwardly therefrom in the direction of drilling, and comprises a thick metal shell of generally frusto conical shape tapered forwardly in the direction of drilling, a plurality of longitudinal teeth-like ridges faced with hard metal at their tips, bearings supporting said shell for free rotation upon said pin, a cap closing the forward end of said shell over the end of said pin and sealing said bearings from entrance of dust at the outer end of said wheel, and means sealing the opposite end of said shell with said pin to prevent entrance of dirt to said bearing.

6. In a drill of the class described, a rock splitting wheel mounted on a pivot pin removably carried by a part of the drill and extending forwardly therefrom in the direction of drilling, and comprising a thick metal shell of generally frusto-conical shape tapered forwardly in the direction of drilling, a plurality of longitudinal teeth-like ridges faced with hard metal at their tips, bearings supporting said shell for free rotation upon said pin, a cap closing the forward end of said shell over the end of said pin and sealing said bearings from entrance of dust at the outer end of said wheel, and means sealing the opposite end of said shell with said pin to prevent entrance of dirt to said bearing.

References Cited in the file of this patent
UNITED STATES PATENTS

| | | |
|---|---|---|
| 2,161,000 | Andersen | June 6, 1939 |
| 2,165,666 | Tilly | July 11, 1939 |
| 2,720,391 | McCarthy et al. | Oct. 11, 1955 |
| 2,754,099 | Tracy | July 10, 1956 |
| 2,756,037 | Kirkpatrick | July 24, 1956 |
| 2,770,449 | McCarthy | Nov. 13, 1956 |
| 2,774,570 | Cunningham | Dec. 18, 1956 |
| 2,864,600 | Kirkpatrick | Dec. 16, 1958 |
| 2,886,293 | Carr et al. | May 12, 1959 |
| 2,915,291 | Gulfelt | Dec. 1, 1959 |